March 3, 1931. H. T. HERR 1,794,518
ENGINE GOVERNOR
Filed Jan. 19, 1929 7 Sheets-Sheet 2

INVENTOR
H.T. Herr
BY
A. B. Reavis
ATTORNEY

Patented Mar. 3, 1931

1,794,518

UNITED STATES PATENT OFFICE

HERBERT T. HERR, OF PHILADELPHIA, PENNSYLVANIA, ASSIGNOR TO WESTING-HOUSE ELECTRIC & MANUFACTURING COMPANY, A CORPORATION OF PENNSYLVANIA

ENGINE GOVERNOR

Application filed January 19, 1929. Serial No. 333,665.

My invention relates to governing systems for internal combustion engines and particularly to governing systems for internal combustion engines of the Diesel type and it has for an object to provide a governing system of the character designated which shall be capable of reliably, accurately and effectively controlling the amount of fuel injected into the engine cylinders as well as the time of such injection of fuel.

It has for a further object to provide a governing system of the foregoing character which shall be especially adapted for use with engines operating over a relatively wide speed range, such as, for example, the engines employed to motivate railway vehicles and it has for still another object to provide a form of governing system for variable speed internal combustion engines in which the intensity of the governing force shall be substantially the same whether the engine be operating at the upper or lower end of its speed range or at any intermediate point thereof.

It has for still another object to provide a governing system for internal combustion engines which shall be capable of accurately controlling the amount of fuel injected into the engine cylinder so as to maintain the speed of the engine at a predetermined figure and which shall also be capable of automatically adjusting the time of injection coincident with effected changes in operating speed.

It has for still another object to provide a form of governing system of the character heretofore designated which shall be of the hydraulic type and which shall occupy a relatively small amount of space, embody a minimum number of working parts and which shall be relatively inexpensive to manufacture.

It has for still another object to provide a governing system of the hydraulic type which shall be especially applicable to internal combustion engines having pumps for the solid injection of fuel into the engine cylinders and which shall be capable of adjusting the phase relation of the injection fuel pump drive shaft and engine crank shaft coincident with effected changes in the operating speed of the engine.

These and other objects are effected by my invention, as will be apparent from the following description and claims taken in connection with the accompanying drawings, forming a part of this application, in which:

Fig. 8 is a view, in longitudinal sectional elevation, taken on the line VIII—VIII of Fig. 2 and showing the detailed construction of the governor pump and the lubricating oil pump associated with the engine; and,

Figure 1:
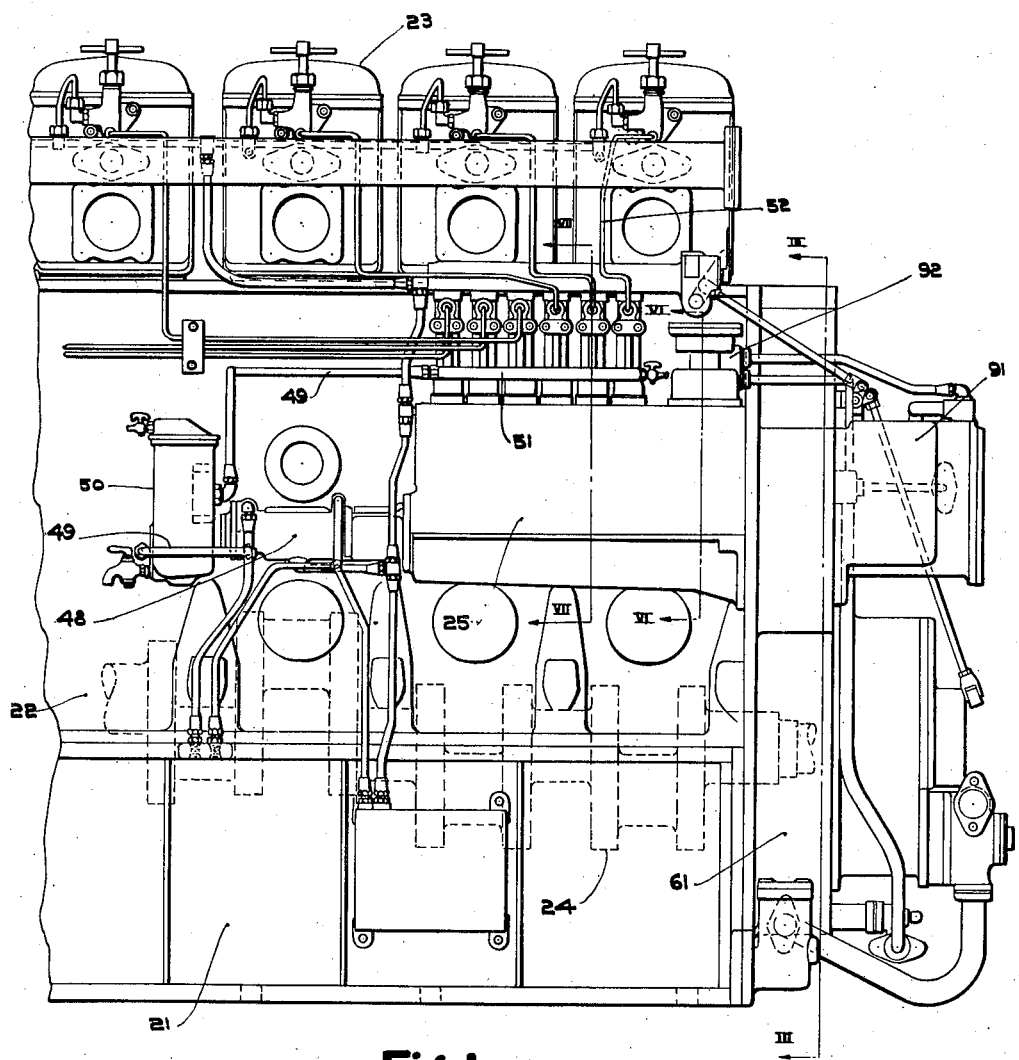
Fig. 1 is a view, in side elevation, of a multi-cylinder internal combustion engine of the Diesel type provided with one form of governing system arranged in accordance with my invention;

It is well to remote the conventional form of centrifugal governor, which governor 95 may be either of the mechanical or hydraulic type, develops a governing force which varies as the square of the engine speed. Governors of this character are especially well adapted for use with prime movers, such as steam turbines or internal combustion engines, wherein the engine is intended for operation at substantially constant speed. However, where it is necessary to operate engines over a very wide range of speeds, such as in railway work, where it may be desirable to operate an internal combustion engine throughout a speed range of, for example, from 300 R. P. M. to 800 R. P. M., the conventional form of governor develops, through its inertia members or fly-balls, a governing force which varies to such a wide extent that it is not practicable to provide a spring for opposing the governor force which shall have the characteristics necessary to provide sensitive and normal governing over the entire speed range.

In order to adapt mechanical governors to Diesel engines operating under the foregoing conditions, it has heretofore been proposed to have the governor spring oppose the force exerted by the governor inertia members or fly-balls through the intermediary of a lever. The arrangement is such that the inertia members apply their force to a fixed point on the lever while the force of the spring opposing the action of the inertia members may be applied at different points of the lever. In such governors, both the scale of the spring and the effective arm of the levers are varied to obtain the proper speed variations; and, because of the added effect of the lever, a spring can be employed having a scale which will be sufficiently sensitive to operate in a satisfactory manner over the entire speed range. However, such a form of governor involves a rather complicated mechanical structure, occupies considerable space at the forward end of the engine, and must necessarily embody a large number of working parts. Furthermore, such governors frequently fail to operate as intended over the entire speed range.

I have, therefore, conceived of a form of hydraulic governor which is especially applicable to Diesel engines of the foregoing character in that, instead of a widely varying governor force, a substantially constant or uniform governing force is exerted throughout the entire speed range. Hence, a spring for opposing such a governor force may be readily provided having characteristics which will assure sensitive and accurate governing throughout the entire speed range. As proposed, my improved form of governor is capable of acting directly upon the pumps for metering the amount of fuel injected into the engine cylinders in accordance with the desired operating speed and, furthermore, my governing system is capable of adjusting the time of the injection of fuel into the cylinders coincident with adjustments of the speed changer.

Briefly speaking, my governing system embodies essentially a pump, preferably of the positive displacement type, such as a gear pump, and developing a fluid pressure which is a function of the engine speed. The pressure developed by the pump is imposed upon a pressure-responsive mechanism which, in turn, is operatively connected to the fuel injection pumps and the valves associated therewith for controlling the duration of the period of fuel injection into the engine cylinders. Variations in the operating speed of the engine are effected by a leak-off connection provided between the pump and the pressure-responsive mechanism, the capacity of the leak-off connection being controlled by an adjustable orifice. Opening of the orifice permits a relatively large amount of fluid to escape through the leak-off connection and hence the governing pressure has a tendency to fall so that the pressure-responsive mechanism speeds up the engine until the pump is again capable of developing its normal governing pressure, even though the orifice is in a more open position. Hence, opening of the orifice effects an increase in the speed of the engine while closing of the orifice retards escape of fluid through the leak-off connection and the governing pressure consequently tends to increase and the speed of the engine is lessened until the governing pump again develops its normal pressure. It will, therefore, be apparent that the governing pressure or governing force is normally the same no matter in what portion of the speed range the engine is operating.

In addition, the mechanism for adjusting the capacity of the orifice is operatively connected to a spline shaft interposed between the engine crank shaft and the drive shaft of the fuel injection pumps so that, coincident with adjustments of the orifice, the phase relationship of the engine crank shaft and the fuel injection pumps is altered. In this way, the timing of the fuel injection is made earlier or later corresponding with the operating speed of the engine. I have found such a form of governing system to be very effective; at the same time, it comprises relatively few working and wearing parts, is very compact, and is less expensive to manufacture than governing systems of the mechanical type heretofore provided for controlling the speed of engines of this character.

Referring to the drawings for a detailed description of my invention, I show in Fig. 1, one form of engine to which my improved governing system may be applied. As shown, the engine embodies a foundation structure 21, a frame 22, a plurality of working cylinders 23, and a crank shaft 24, all arranged in the usual manner. Located on the side of the engine frame 22 and carried thereby is a fuel pump 25 for injecting fuel into the engine cylinders.

Figure 7:
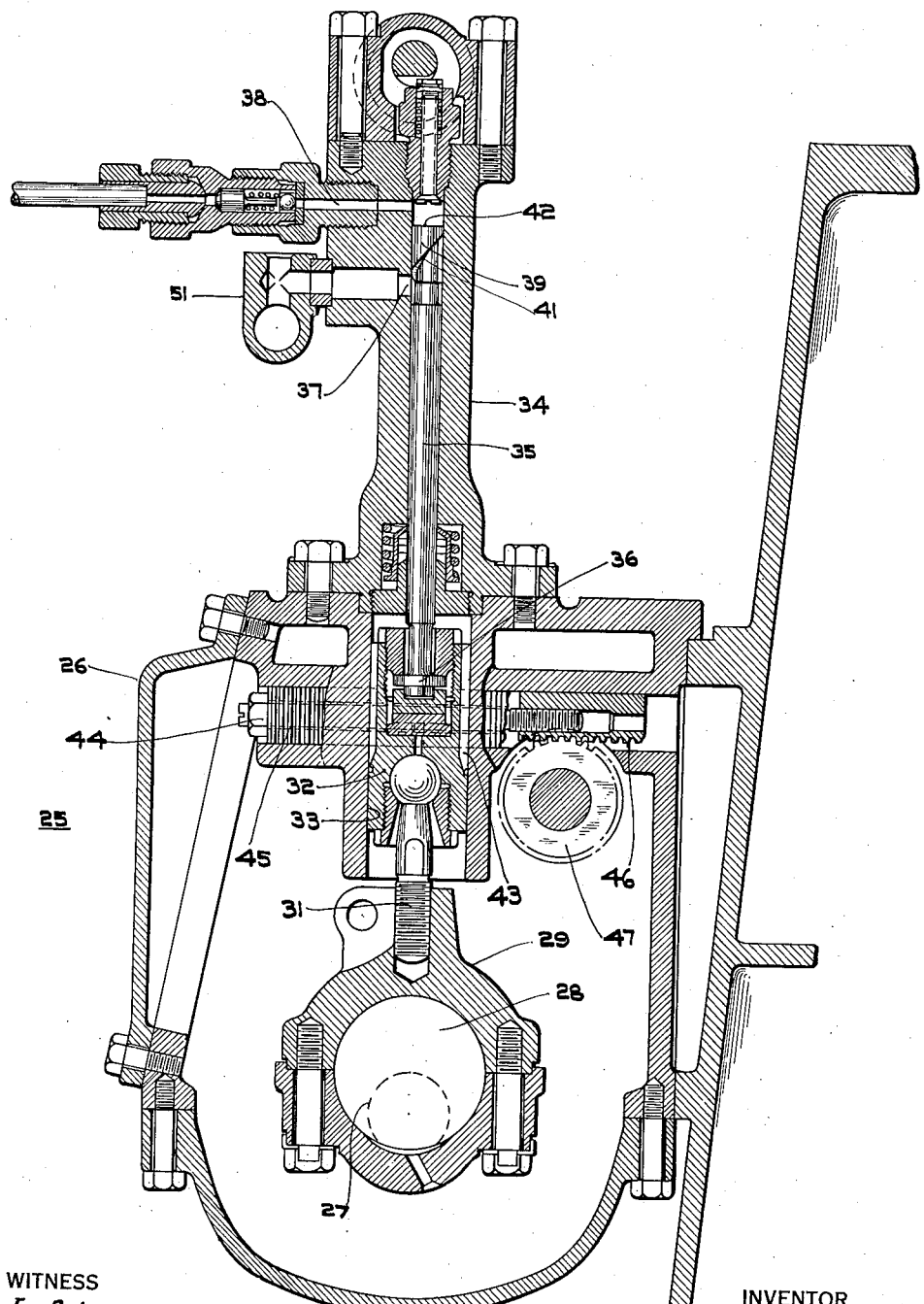
Fig. 7 is a view, in transverse sectional elevation, taken on the line VII—VII of Fig. 1 and showing the detailed construction of one of the engine fuel injection pumps;

Although my invention is applicable to an engine having any form or type of fuel injection system, nevertheless, I have illustrated a fuel injection system of the solid type, that is, fuel is delivered to the cylinders by pumping action without the aid of any additional or extraneous fluid under pressure, such as compressed air. Referring now to Fig. 7, it will be seen that the fuel pump 25 comprises a housing 26 within which is located a fuel injection pump drive shaft 27. Secured to the drive shaft is an eccentric 28 which is operatively connected through an eccentric strap 29 and a pin 31 to a cross head 32 carried in a guide 33.

Superposed upon the housing 26 is a fuel injection pump cylinder 34 within which is located a plunger 35 connected to the cross head 32, as at 36. The cylinder 34 is provided with a fuel admission port 37 and a fuel discharge port 38, the two ports being located in spaced relation as illustrated. The plunger 35 is provided at its upper end with a slide valve portion 39 arranged to cover and uncover the fuel admission port 37. The slide valve portion 39 is so formed that, upon upward movement of the plunger 35, fuel is displaced from the cylinder through the fuel admission port 37 until such time as the slide valve portion 39 covers the fuel admission port 37, whereupon the fuel in the upper end of the cylinder is trapped and is discharged at relatively high pressure through the fuel discharge port 38. As soon as the slide valve portion 39 has traveled past the fuel admission port 37, the pressure is released and the fuel is again free to pass outwardly through the fuel admission port 37, the arrangement being such that during an intermediate portion of each working stroke of the plunger 35, the slide valve 39 closes the fuel admission port 37 and during the time when the latter port is closed, the fuel entrapped in the pump cylinder is discharged through the outlet port 38 on the upward stroke. For a more detailed description of the operation of this portion of my invention, reference may be had to my copending application, Serial No. 292,197, filed July 12, 1928, entitled Fuel injection system, and assigned to the Westinghouse Electric & Manufacturing Company.

Preferably, the slide valve portion 39 has its lower margin or cut-off edge 41 disposed angularly with respect to the leading cut-off edge or margin 42 so that the effective length of the valve portion 39 or the length of time when the fuel admission port is closed by the slide valve 39 may be varied by angular adjustment of the plunger 35. In order to effect such adjustment, the cross head 32 is preferably provided with a plurality of circumferentially spaced, longitudinally extending teeth 43, which teeth mesh with a transversely extending rack 44 having teeth 45 engaging the teeth 43 of the cross head 42 and additional teeth 46, arranged at right angles to the teeth 45 and engaging a fuel pump rack shaft 47. As arranged and as will be apparent from Fig. 5, each individual fuel injection pump is provided with a rack 44 all of which mesh with the common rack shaft 47.

As shown in Fig. 1, all of the pumps are supplied with fuel from a booster pump 48 connected by conduits 49 and a filter 50 to a common manifold 51 communicating with the respective inlet ports 37 of all of the fuel injection pumps. Each of the fuel injection pumps is connected through separate conduits 52 to their associated cylinders for supplying fuel for combustion thereto. While in the present embodiment, I have illustrated a form of engine wherein a separate fuel injection pump is provided for each cylinder, nevertheless, it is obvious that my invention is also applicable to engines wherein a single fuel injection pump supplies several cylinders.

From the foregoing, it will be apparent that angular movement of the rack shaft 47 effects longitudinal movement of all of the racks 44 and corresponding angular movement of all of the cross heads 32, thereby varying the effective length of the slide valve 39 provided on each pump plunger and consequently varying the duration of the period of fuel injection. In other words, the rack shaft 47 controls the amount of fuel injected into the engine cylinders.

Figure 3:
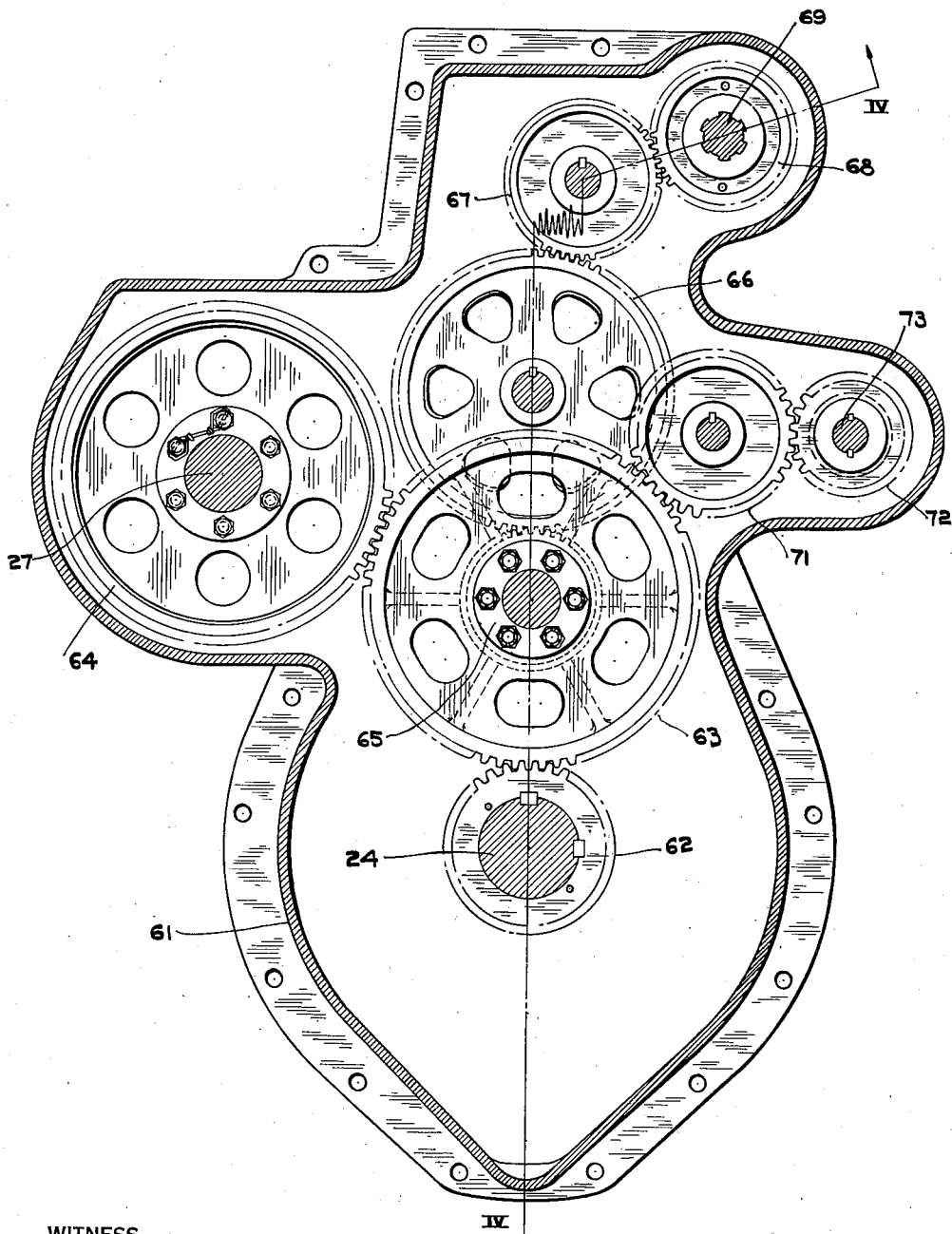
Fig. 3 is a view, in transverse sectional elevation, taken on the line III—III of Fig. 1 and showing the arrangement of the gear train employed for driving the engine auxiliaries from the engine crank shaft.
Figure 4:
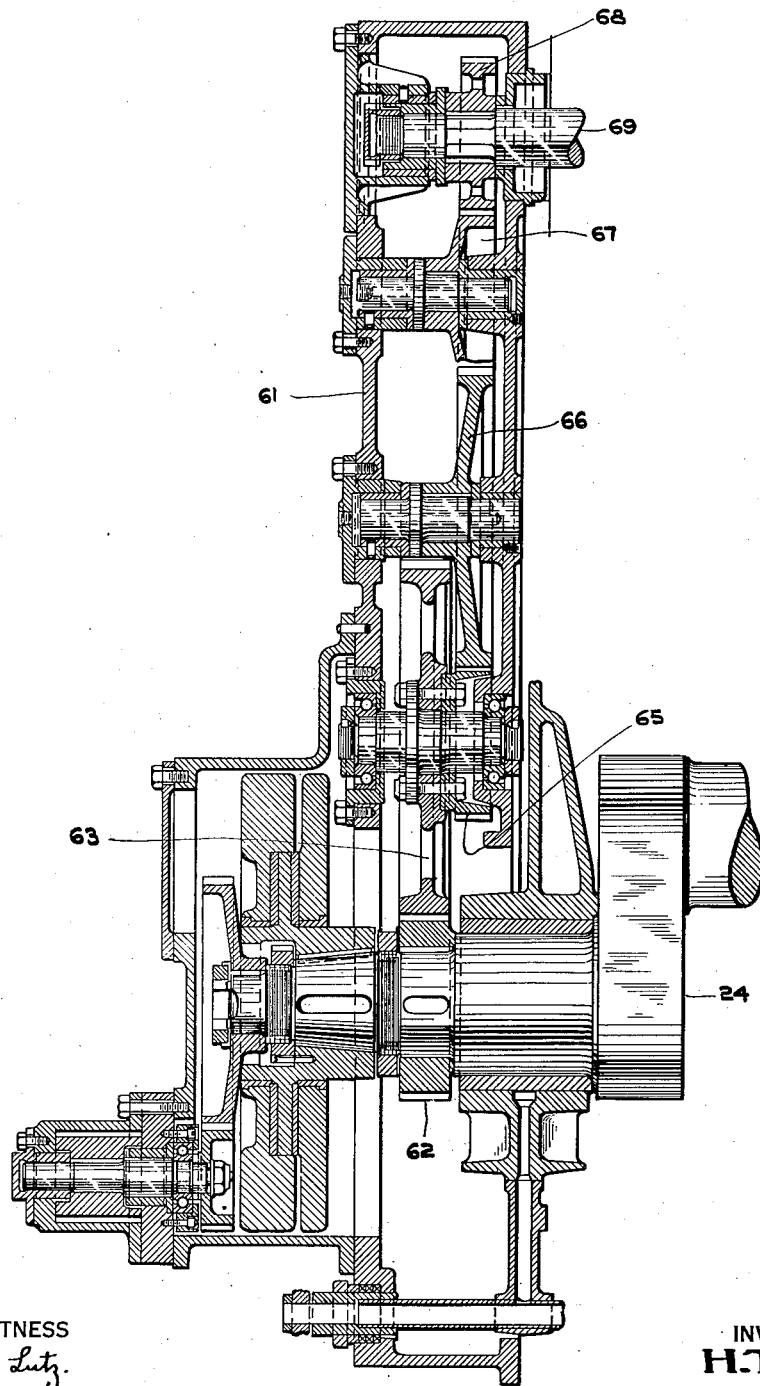
Fig. 4 is a view, in longitudinal sectional elevation, taken on the line IV—IV of Fig. 3 and also showing the gear train employed for driving the engine auxiliaries from the engine crank shaft.

Referring now to the mechanism provided for actuating the fuel injection pumps drive shaft 27, reference may be had to Fig. 1 in which is shown, at the forward end of the engine, a gear case 61 for housing the transmission means or gearing required for driving the various engine auxiliaries, such as the fuel pumps, lubricating oil pumps, etc., from the engine crank shaft. Referring in detail to Figs. 3 and 4, it will be apparent that the crank shaft 24 is provided with a drive pinion 62 meshing with an idler gear 63, which, in turn, meshes with a gear 64 for driving the fuel injection pumps. As illustrated, the engine is of the four-cycle type and hence the pinion 62 and gears 63 and 64 are so proportioned that the fuel pump drive shaft 27 rotates at one-half of the speed of the crank shaft 24. However, it is obvious that my invention is equally applicable to engines of the two-cycle type wherein the fuel pump drive shaft 27 rotates at the same speed as the crank shaft 24. Referring further to the gears shown in Figs. 3 and 4, the idler gear 63 preferably has secured thereto a pinion 65 meshing through idler gears 66 and 67 with a gear 68 secured to a cam shaft 69 for actuating the same, the arrangement being such that the cam shaft operates at one-half the crank shaft speed, as required by the engine cycle. The idler gear 63 also meshes through an idler gear 71 with a gear 72 secured to a pump shaft 73 which may be arranged, if desired, to operate at greater than crank shaft speed.

Figure 5:
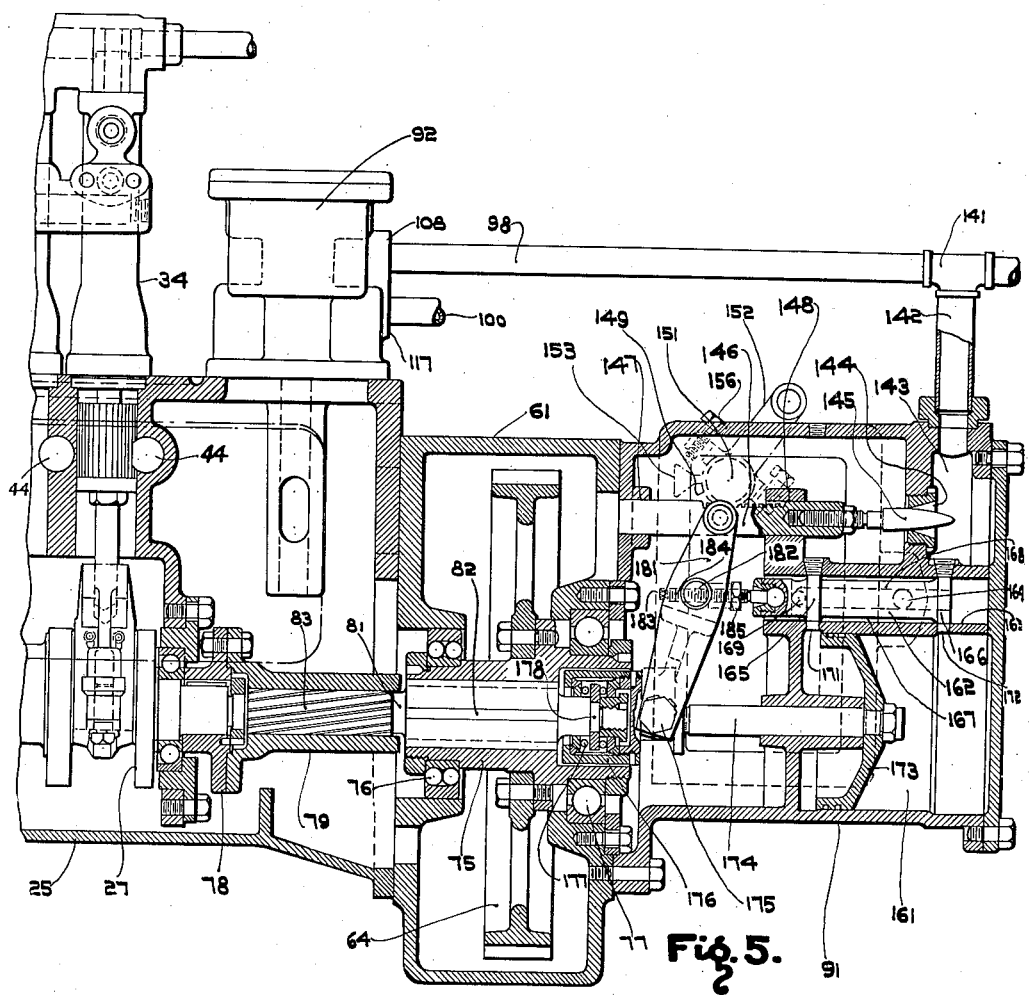
Fig. 5 is a longitudinal view, partly in elevation and partly in section, taken on the line V—V of Fig. 2, and shows the fuel pumps and a portion of the governing system associated therewith.

As shown in Fig. 5, the fuel pump drive gear 64 is provided with a hub portion 75 supported in bearings 76 and 77 provided in the gear case 61. The forward end of the injection pump drive shaft 27 is preferably provided with a coupling 78 having a projecting portion 79 arranged coaxially with the hub portion 75 of the fuel pump drive gear 64. Fitting into the projecting portion 79 of the coupling and the hub portion 75 of the gear 64 is a spline shaft 81 for connecting them in operative relation. As shown, the spline shaft has the portion engaging the gear 64 provided with a plurality of longitudinally-extending teeth or key members 82 slidably fitting in corresponding recesses provided in the hub portion 75 of the gear. The arrangement is such that the gear 64 drives angularly the spline shaft 81 while, at the same time, free axial movement of the spline shaft 81 relative to the gear 64 is permitted.

The spline shaft 81 has its portion engaging the fuel pump coupling 78 provided with a plurality of teeth or projecting keys 83 which, although extending generally in an axial direction, are somewhat inclined with respect to the axis of the shaft. The teeth 83 slidably engage cooperating recesses provided in the coupling 78, the arrangement being such that the shaft 81 drives the fuel injection pump coupling 78 in a desired phase relationship with the drive gear 64; and, upon the spline shaft 81 being moved in an axial direction relative to both the gear 64 and the coupling 78, the latter is displaced angularly relative to the gear 64 an amount depending upon the extent of displacement of the spline shaft and thus the phase relationship is altered. By means of such an arrangement, the phase relationship of the fuel pumps relative to the engine crank shaft may be varied so that the period of injection of fuel into the engine cylinders may be made relatively early or relatively late in the engine working cycle in accordance with the operating speed of the engine. I have found that the provision of such a spline shaft provides a very compact, rigid and reliable form of mechanism for readily varying the time of fuel injection.

Adjustment of both the fuel rack shaft 47 as well as the spline shaft 81 for varying the quantity of fuel injected into the engine cylinders as well as the time of injection may be accomplished by means of my improved governing system preferably arranged in the manner now to be described.

Figure 2:
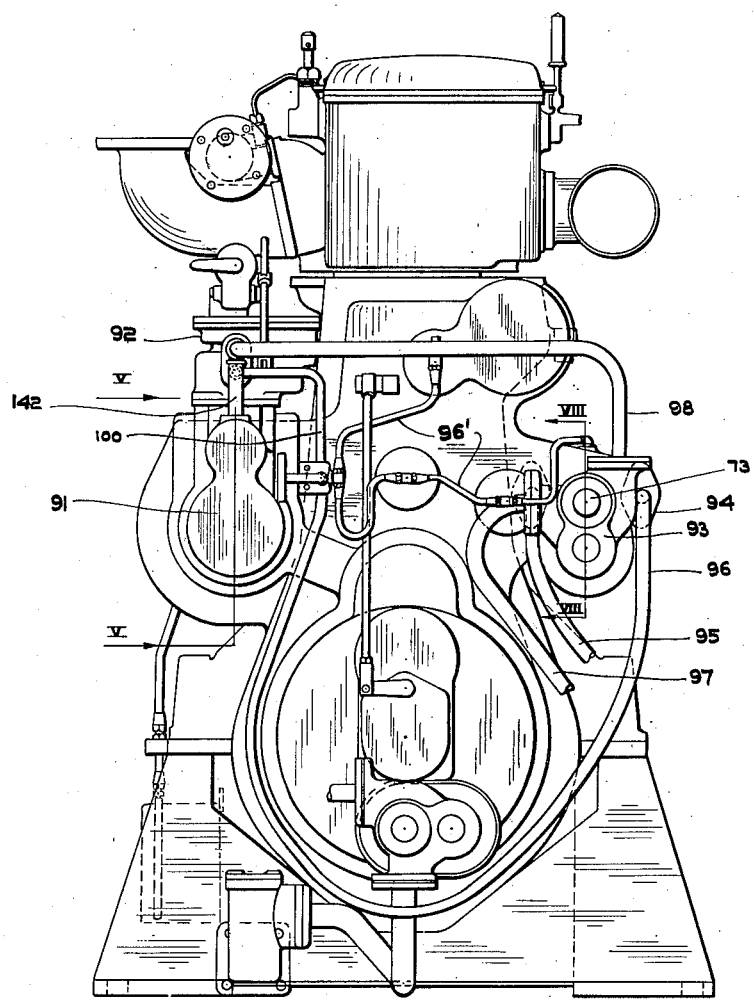
Fig. 2 is a view, in front elevation, of the engine shown in Fig. 1.

Referring to Figs. 1 and 2, I show governor housings 91 and 92, the housing 91 being preferably located and supported upon the forward or front face of the gear case 61 in close relation with the spline shaft 81 and the housing 92 being superposed upon the forward end of the fuel injection pump housing 25 in close relation to the fuel pump rack shaft 47. As stated heretofore, my improved governing system is of the hydraulic or fluid type; and I, therefore, provide, as shown in Fig. 2 and particularly in Fig. 8, a governor pump 93 and a main lubricating oil pump 94 both preferably driven from the pump shaft 73 through the gear 72, the arrangement of the drive gears having been heretofore described with reference to Fig. 3. As shown, the pumps 93 and 94 are preferably of the gear type although it is obvious that other types of pumps may be employed without departing from the spirit or scope of my invention.

The main lubricating pump 94 withdraws lubricant through a conduit 95 from a suitable reservoir (not shown) and discharges the same at an increased pressure through a conduit 96 while the governor pump 93 is also provided with a suction conduit 97 connecting with a suitable supply reservoir (not shown) and discharges the lubricant at an increased pressure through a conduit 98, see Fig. 2. It is noted at this time that the main lubricating pump 94 supplies lubricant under pressure to the bearings and other various working parts of the engine through conduits 96′ and also provides lubricant which serves in the capacity of an actuating fluid in the various governing system relays. The governor pump 93 generates or develops the oil pressure which motivates the governor system.

Figure 6:
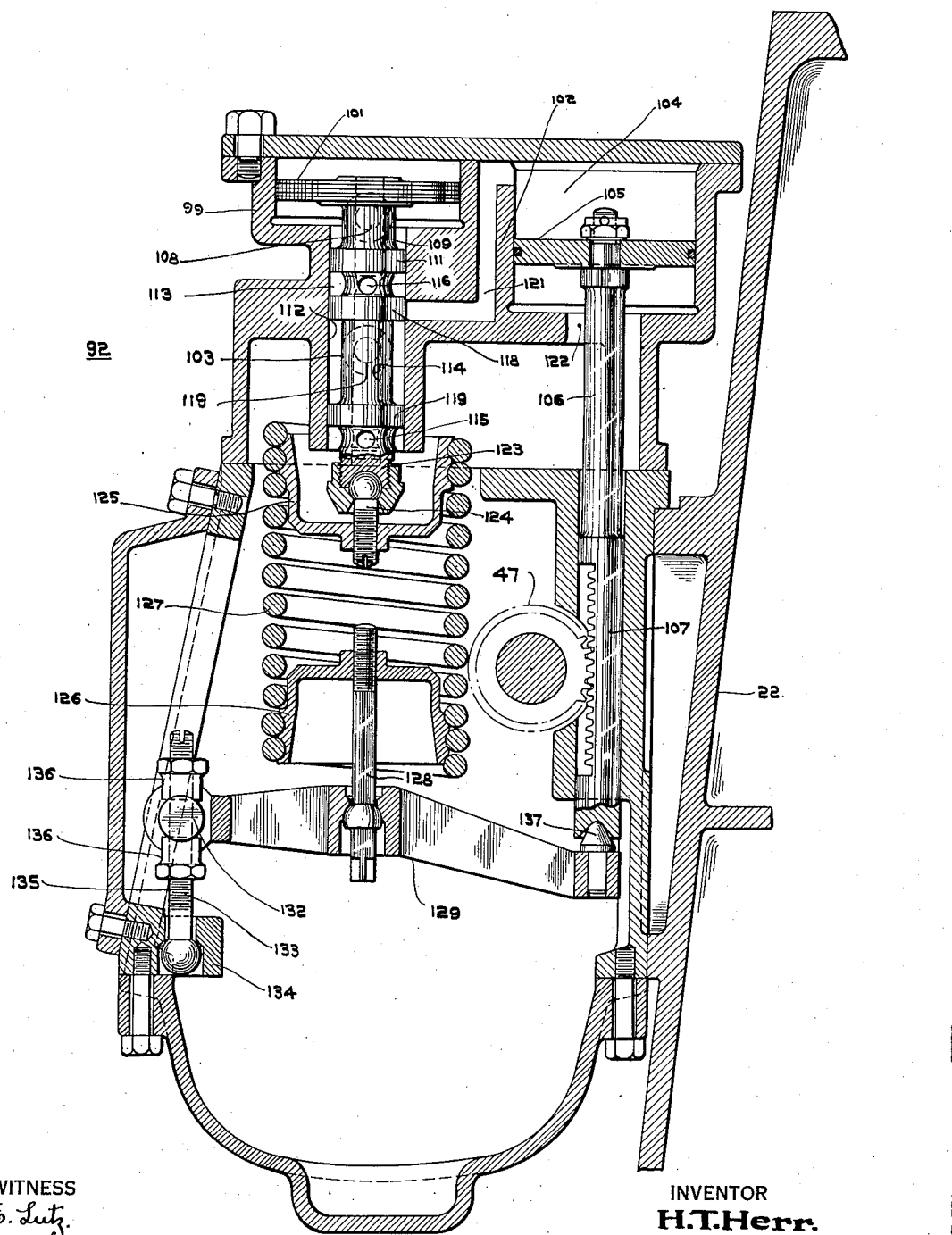
Fig. 6 is a view, in transverse sectional elevation, taken on the line VI—VI of Fig. 1 and showing the pressure-responsive element 80 embodied in my governing system.

The governor pump, therefore, discharges through a conduit 98, to the housing 92 within which is located a governor pressure-responsive cylinder 99 provided with a suitable piston 101 as shown in Fig. 6. Also embodied within the housing 92 is a fluid relay mechanism 102 embodying essentially a pilot valve 103 and a power cylinder 104 provided with a suitable piston 105 connected through a piston rod 106 to a master fuel pump rack 107. The latter meshes or engages with the rack shaft 47 projecting within the housing 92 and hence the fluid relay mechanism 102 serves to actuate the rack shaft 47 and then through the latter, the individual racks 44 associated with the several fuel pumps.

The pressure of the oil in the conduit 98 and developed by the governor pump is admitted to the under side of the piston 101 through an inlet 108. The piston 101 is secured to the pilot valve 103 by a sleeve connection 109 provided with a piston portion 111 fitting the pilot valve cylinder 112. The piston 111 serves to confine the governing lubricant within the lower portion of the cylinder 99 beneath the piston 101 and, should any lubricant escape past the piston 111, it enters an annular space 113 intervening between the piston 111 and the pilot valve 103. The pilot valve 103 as well as the sleeve connection 109 and the piston 101 are provided with a common longitudinally-extending passageway 114 connecting at its lower end, through a plurality of radial openings 115, with the interior of the housing 92 for discharging or relieving thereto any lubricant escaping past the piston 101 and accumulating in the upper portion of the governor pressure-responsive cylinder 99. The passageway 114 also connects, through suitable radial openings 116, with the annular space 113 so that lubricant escaping past the piston 111 is also relieved to the interior of the housing 92.

Lubricant under pressure from the main lubricating pump is supplied through a branch conduit 100 and an inlet connection 117, to the pilot valve 103. This lubricant is confined in the cylinder 112 within the annular space intervening between the two longitudinally spaced pistons 118 and 119 of the pilot valve 103. Any lubricant escaping past the piston 119 drains into the interior of the housing 92, while any lubricant escaping past the piston 118 enters the annular space 113 and is relieved to the interior of the housing through the radial openings 116 and the passageway 114.

From the foregoing, it will be apparent that the lubricant pressure developed by the governor pump is maintained in the lower portion of the cylinder 99 and acts upon the under face of the piston 101 while lubricant under pressure from the main lubricating pump is confined within the annular space intervening between the pistons 118 and 119 of the pilot valve 103, which lubricant serves as actuating fluid to motivate the piston 105 of the power cylinder 104, a passageway 121 being provided for this purpose. Lubricant escaping past the piston 105 is drained to the interior of the housing 92 through an opening 122 provided in the lower portion of the cylinder about the piston rod 106.

The lower end of the pilot valve 103 is provided with a connection 123 which is pivotally and freely secured to a pin 124 for supporting a spring retainer 125. Spaced from the latter is another spring retainer 126, the two spring retainers cooperating to secure opposite ends of a governor spring 127. The latter is preferably retained under tension between the retainers 125 and 126 and is arranged to oppose the tendency toward upward movement of the piston 101 as influenced by the pressure of the lubricant in the lower portion of the governor pressure-responsive cylinder 99. The lower spring retainer 126 is supported upon a pin 128 freely and pivotally retained in a lever 129. Both the retainers 125 and 126 are preferably secured to their respective retaining pins 124 and 128 by means of screw threads in order that the tension of the spring 127 may be accurately adjusted.

The lever 129 is fulcrumed at 132 to a retaining pin 133 seated in a bracket 134 embodied in the housing 92. The pin 133 is preferably provided with screw threads 135 and lock nuts 136 in order that the fulcrum point of the lever 129 may be accurately adjusted. Like the spring retaining pin 128, the pin 133 is retained in position in the bracket 134 through the tension of the spring 127. The lever 129 is provided at the end opposite its fulcrum point with a bearing pin 137 engaging the lower end of the master fuel pump rack 107 and being held in abutting relation therewith because of the tension of the governor spring 127.

From the foregoing, it will be apparent that an increase in pressure in the lower portion of the cylinder 99 moves the piston 101 in an upward direction and with it the pilot valve 103 permitting the piston 118 of the pilot valve to uncover the passage 121. The uncovering of the passage 121 permits fluid under pressure to act upon the upper face of the piston 105, moving the master fuel pump rack 107 in a downward direction and adjusting angularly the rack shaft 47. The initial upward movement of the piston 101 increases the tension upon the governor spring 127 and the downward movement of the piston 105 moves its associated end of the lever 129 in a downward direction, creating a tendency to further increase the tension of the spring 127 and causing the same to draw the piston 101 in a downward direction against the pressure prevailing in the cylinder 99, the latter movement restoring the piston 101 and the pilot valve 103 to their original or cut-off position. In this way, the lever 129 cooperates with the power cylinder as well as the pilot valve and the pressure-responsive piston to restore the governing system to a state of equilibrium upon any change in the operating characteristics of the engine.

In order to vary the speed of the engine, it is necessary to effect changes in the pressure of the governing fluid prevailing in the pressure-responsive cylinder 99; and hence, as shown particularly in Fig. 5, I provide the conduit 98, for example, with a T fitting 141, connecting through a conduit 142 with an orifice chamber 143 embodied in the housing 91. The orifice chamber 143 is provided with an orifice nozzle 144 through which lubricant discharged by the governor pump 93 may be relieved or drained off to the interior of the housing 91. The flow of lubricant through the orifice 144 is controlled by means of an orifice regulator 145 arranged co-axially with the orifice and movable longitudinally therein, the regulator being so formed that movement thereof results in increasing or decreasing the flow area of the orifice or passageway through which the lubricant is discharged from the orifice chamber. In other words, if the orifice regulator is moved to the left, considerable lubricant is discharged from the orifice chamber and hence the fluid pressure prevailing in the orifice chamber as well as the conduit 98 and pressure-responsive cylinder 99 has a tendency to decrease whereas, if the orifice regulator is moved to the right, the flow area of the orifice nozzle is made relatively small and consequently the pressure in the conduit 98 and pressure-responsive cylinder has a tendency to increase.

In order to adjust the orifice regulator 145, an orifice rack 146 is provided, which rack is carried in bearings 147 and 148 embodied in the housing 91. Meshing with the orifice rack 146 is a pinion 149 secured to a shaft 151 extending transversely across the housing 91 and having secured thereto, exteriorly of the housing 91, a lever 152. The latter, as is apparent, is utilized to adjust the position of the orifice rack 146 and hence controls the operating speed of the engine as will presently be described. The exterior of the housing 91 is provided with a stop 153 and the lever 152 is provided with adjustable stop pins 156 arranged to engage the stop 153 and prevent excessive or objectionable movement of the orifice rack 146.

It will be apparent from the foregoing, that adjustment of the orifice rack 146, creates a tendency to change the normal fluid pressure prevailing in the orifice chamber 143 which change is imposed upon the piston of the pressure-responsive cylinder 99 to alter the operating speed of the engine so as to return the fluid pressure in the orifice chamber 143 to normal. Incident to any desired operating change in speed, it may be desirable to alter the time of fuel injection and hence I have devised means whereby movement of the orifice rack 146 effects an adjustment of the spline shaft 81 so as to change the phase relationship of the fuel injection pumps relative to the engine crank shaft. Accordingly, I embody within the housing 91 a spline shaft relay mechanism embodying essentially a power cylinder 161 and a pilot valve 162. The pilot valve 162 operates in a cylinder 163 embodied in the housing 91 and to which lubricant under pressure from the main lubricating pump 94 is supplied through an inlet 164. The pilot valve 162 is provided with longitudinally spaced pistons 165 and 166 arranged to confine the lubricant under pressure admitted through the inlet 164 to the annular space 167. The relay valve 162 is provided with a central passageway 168 having one end provided with radial openings 169 for relieving to the interior of the housing 91 fluid discharged from the forward end of the cylinder 161.

The cylinder 161 is provided with ports 171 and 172 arranged to be covered and uncovered, by the piolt valve. In this way, movement of the pilot valve towards the forward end of the engine places the interior of the cylinder 161 in communication with the annular space 167, admitting relatively high pressure fluid through the port 172 to the forward end of the cylinder 161 and moving the piston 173, toward the rear of the engine. At the same time, the piston 165 of the relay valve, having moved forward of the port 171, permits the fluid present in the rear end of the cylinder 161 to be relieved to the interior of the housing 91.

The piston 173 has its rod 174 connected through a toggle joint 175 with the stationary member 176 of a thrust bearing 177, the rotor member 178 of the thrust bearing 177 being in turn connected to the spline shaft 81. The arrangement is such that the piston 173 may shift the spline shaft 81 longitudinally while the latter is rotating to drive the fuel injection pumps, the entire thrust bearing 177 being movable as a unit with the spline shaft.

From the foregoing, it will be apparent that forward movement of the piston 173 effects axial displacement of the spline shaft 81 relative to the gear 64 and the coupling 78, which displacement results in effecting angular displacement of the portion 83 of the spline shaft relative to the projecting portion 79 of the coupling so that the fuel pump drive shaft 27 is displaced angularly with respect to the gear 64 and consequently the phase relation of the fuel pump crank shaft relative to the engine crank shaft is altered. In this way, the period of fuel injection may be made relatively early or relatively late depending upon the position of the spline shaft power piston 173.

Pivotally secured to the toggle joint 175 at its one end and to the orifice rack 146 at the other end is a lever 181 also connected, through a suitable toggle joint 182 and a pin 183 to the spline shaft relay valve 162. The arrangement is such that, upon any movement of the orifice rack 146, there is a resulting movement of the spline shaft pilot valve 162 so as to effect movement of the power piston 173. The resulting movement of the latter piston again changes the angular position of the lever 181 so as to restore the pilot valve to its original, static or cut-off position, thus returning the spline shaft relay mechanism to a state of equilibrium pending another adjustment of the orifice rack 146. The pin 183 is provided with threads 184 engaging the toggle joint 182 and it is further provided with a lock nut 185 so that the position of the pilot valve relative to the lever 181 may be manually adjusted and the pin 183 locked in the adjusted position.

It will, therefore, be apparent that in order to effect a change in the operating speed of the engine, the orifice rack 146 is adjusted to alter the flow area of the orifice 144 so as to impose, momentarily, a greater or lesser pressure in the governor cylinder 99 to effect adjustment of the master fuel pump rack 107. Coincident with such change in speed, the orifice rack 146 moves the lever 181, resulting in movement of the pilot valve 162 and consequent adjustment of the spline shaft 81. In this way, upon the operating speed of the engine being changed, the time of fuel injection is altered to suit.

Figure 9:
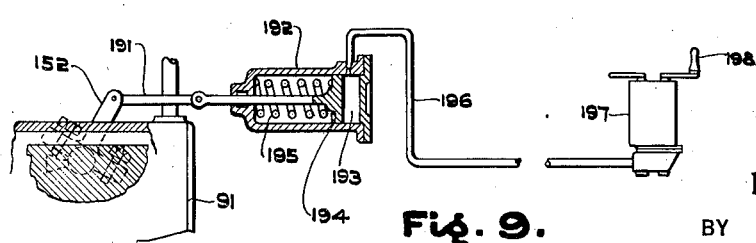
Fig. 9 is a diagrammatic view illustrating one method of adapting my improved governing system to remote control operation.

While in Fig. 5 I show a lever 152 which is located so as to be operated in the vicinity of the engine, nevertheless it is obvious that my improved form of governing system may be readily adapted for remote control. Referring to Fig. 9, I show diagrammatically a form of remote control system which may be applied to my governing system and which form of remote control system is disclosed in my copending application, Serial No. 271,303, entitled Multiple control for Diesel engine units and assigned to the Westinghouse Electric & Mfg. Co. As shown, the orifice rack operating lever 152 is connected through a link 191 to a pressure-responsive element 192. The latter comprises, essentially, a cylinder 193, a piston 194 and a spring 195 for opposing movements of the piston. Fluid under pressure, such as air, is supplied to the under side of the piston through a conduit 196 connecting with a master controller 197. The latter is so constructed that, for various positions of the controller handle 198, predetermined air pressures are set up in the conduit 196. These different air pressures act upon the piston 194 in opposition to the spring 195 so that the piston 194 assumes various positions in the cylinder 193 corresponding with the setting of the master controller handle 198. As will be apparent, movement of the piston 194 is transmitted through the link 191 to the lever 152 so that the orifice rack 146, and hence the speed of the engine, is controlled from the master controller 197. As will be apparent, the master controller may be located in any position remote from the engine and it will therefore be apparent that my improved form of governing system is especially well adapted for remote control operation. Should a more detailed description of the construction and operation of the pressure-responsive element 192 and the master controller 197 be desired, reference may be had to my aforesaid copending application.

From the foregoing description, the operation of my improved governing system will be apparent. It will be noted that, during normal operation, the governor pump 93 supplies lubricant at a constant pressure to the governor responsive cylinder 99. At such times, the engine is running at constant speed and should there be any tendency for the engine to change its speed for any cause such as a change in load, pressure developed by the governor pump 93 changes momentarily and the governor responsive cylinder 99 acts to compensate for the same. For example, should the load decrease and the engine tend to speed up, the governor pump 93 develops momentarily an increased fluid pressure, which increased fluid pressure is impressed upon the piston in the governor responsive cylinder 99 to adjust the master fuel rack 107 to reduce the quantity of fuel injected in the engine cylinders. Upon the quantity of fuel injected into the engine cylinders being reduced, the speed of the engine returns to normal, the pressure developed by the governor pump returns to normal, and the governor responsive piston 101 together with the pilot valve 103 return to their normal or static positions, that is, the position illustrated in Fig. 6, while the power cylinder piston 105 and the master fuel pump rack 107 assume an adjusted position. As is readily apparent, any increase in load upon the engine has a tendency to decrease the speed thereof and results in effecting movement of the governor mechanism to increase the amount of fuel injected into the engine cylinders.

During the operation recited above, it has been assumed that the engine is operating at constant speed. During such times, the orifice regulator 145 remains in fixed position relative to the orifice nozzle 144 and there is no angular adjustment of the spline shaft 81. However, assuming for example, that the engine is designed to operate between a speed range of from 300 R. P. M. to 900 R. P. M. and, further, assuming that it is desired to increase the speed from 400 R. P. M. to 500 R. P. M., then manipulation or adjustment of the lever 152 is effected, which adjustment alters the position of the orifice rack 146. As an increase in the operating speed of the engine is desired, the orifice regulator will be moved toward the rear of the engine so as to increase the flow area of the orifice. As a consequence, more lubricant is permitted to escape from the orifice chamber 143 into the housing 91 and hence the pressure developed by the governor pump 93 drops below normal because of the escape of a greater amount of lubricant through the orifice. This drop in pressure permits the governor pressure responsive piston 101 to move downwardly and the power cylinder piston 105 to move upwardly, thereby adjusting the master fuel pump rack 107 so as to admit more fuel into the engine cylinders. Sufficient addition fuel is admitted to the engine cylinders as will increase the speed of the engine from 400 R. P. M. to 500 R. P. M., at which increased speed, the governor pump 93 is capable of developing its normal pressure even though leakage through the orifice has now increased. Upon the governor pump 93 again developing its normal pressure, the governor pressure responsive piston 101 and pilot valve 103 return to their original or cut-off positions.

Coincident with the longitudinal movement of the orifice regulator 145, there is a movement of the spline shaft relay pilot valve 162 (Fig. 5) to admit lubricant under pressure to the rear end of the cylinder 161 and to relieve lubricant from the forward end of the same cylinder so that the piston 173 is moved in a direction toward the forward end of the engine, thereby adjusting the axial position of the spline shaft 81 and effecting consequent angular adjustment of the fuel pump drive shaft 27 relative to the gear 64 so that the time of fuel injection into the engine cylinders occurs at an earlier period in the engine cycle. In other words, coincident with any adjustment effecting a desired change in the operating speed of the engine, the governor system acts to change the phase relationship of the fuel injection pumps relative to the engine crank shaft. Upon the spline shaft relay power piston 173 assuming its adjusted position, the lever 175 causes the pilot valve 162 to return to its original or cut-off position, that is, the position illustrated. While, in the present embodiment, I have shown a form of engine wherein the time of fuel injection is made relatively early for high speeds and relatively late for low speeds, nevertheless it is apparent that I may, if I so desire, arrange the timing of the fuel injection period in any other desired relation with respect to either the load imposed upon the engine or to its operating speed.

From the foregoing, it will be apparent that I have evolved a novel form of governing system, which governing system is of the hydraulic type and which governing system, although applicable to any form of prime mover for regulating the speed thereof, is especially applicable to internal combustion engines. While, in the present embodiment I employ two separate pumps, one of which supplies the governing fluid and the other of which supplies the lubricant or motive fluid for operating the various power relays and, in addition, supplies the lubricant required by the working parts of the prime mover, nevertheless it will be apparent that it is within the purview of my invention to utilze a single pump to perform all of these functions. Then, again, I may provide a pump for supplying the governing fluid, another pump for supplying fluid for actuating the relay mechanisms, and still another pump for supplying lubricant to the working parts of the engine. It will be further apparent that while, in the present embodiment, I disclose a pump of the gear type for supplying the governing fluid, nevertheless other types of pumps may be employed capable of developing a pressure which varies as a function of the speed of the engine. While, in the present embodiment, my improved governing system is capable of both regulating the quantity of fuel injected into the engine cylinders as well as the time of fuel injection, nevertheless, in engines wherein it is not desired to adjust the time of injection relative to the speed of the engine, the portion only of my governing system may be readily applied as is effective to adjust the fuel pumps to regulate the quantity of fuel injected.

It will be further obvious that my governing system is so arranged that adjustment of the spline shaft is effected during the operation of the engine and it will be further noted that the orifice regulator is preferably formed that, for each unit of axial movement thereof, such predetermined axial movements of the spline shaft are effected as will alter the timing of the fuel pumps in proper relation to the increased speed resulting from the adjusted position of the orifice regulator. It will be further apparent that the foregoing coordination may be accomplished by forming the contour of the orifice regulator in the manner illustrated, or it may be accomplished in equivalent ways, such as shaping the teeth 83 of the spline shaft 81 to provide the desired operating results. Although in the present embodiment I have shown a specific type of fuel injection system, nevertheless my improved governing system may be readily applied to different forms of fuel injection system and although, in the present embodiment, I have shown an engine of the four-cycle type, nevertheless it will be apparent that my improved governing system is equally applicable to engines of the two-cycle type.

It will be further apparent that one of the major advantages of my improved governing system resides in the fact that the governing pressure, that is, the pressure developed by the governor pump 93, is at all times substantially constant whether the engine be operating at the lower end of its speed range or at the upper end of its speed range. In other words, throughout the entire speed range of the engine, the governing force is substantially the same so that the governor spring 127 is capable of providing sensitive and accurate governing at all times.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a governing system, the combination with an internal combustion engine embodying a plurality of working cylinders, and means for periodically supplying fuel to the 1. In a governing system, the combination with an internal combustion engine embodying a plurality of working cylinders, and means for periodically supplying fuel to the engine cylinders in timed relation with the engine crank shaft, of means providing a governing fluid pressure varying as a function of the speed of the engine, means responsive to the pressure of the governing fluid for controlling the quantities of fuel admitted to the engine cylinders, adjustable means for regulating a characteristic of the governing fluid so as to effect changes in the operating speed of the engine, and means responsive to adjustments of said governing fluid regulating means for effecting changes in the timing of the fuel supply periods relative to the engine crank shaft.

2. In a governing system, the combination with an internal combustion engine embodying a plurality of working cylinders, and means for periodically supplying fuel to the engine cylinders in timed relation with the engine crank shaft, of means providing a governing fluid pressure varying as a function of the speed of the engine, pressure-responsive means for controlling the quantities of fuel admitted to the engine cylinders, means for conveying fluid to the governing fluid pressure providing means and for conveying the fluid discharged thereby toward the pressure-responsive means, means associated with the conveying means for regulating the resistance to flow of governing fluid so as to effect changes in the operating speed of the engine, and means responsive to movement of said governing fluid regulating means for effecting changes in the timing of the fuel supply periods relative to the engine crank shaft.

3. In a governing system, the combination with an internal combustion engine embodying a plurality of working cylinders, and means for periodically supplying fuel to the engine cylinders in timed relation with the engine, of means providing a governing fluid pressure varying as a function of the speed of the engine, means responsive to the pressure of the governing fluid for controlling the quantities of fuel admitted to the engine, conduit means connecting the governing fluid pressure providing means with the pressure-responsive means, a bleeder connection in said conduit means, means for regulating the flow area of said bleeder connection for effecting desired changes in the operating speed of the engine, and means responsive to movement of said regulating means for effecting changes in the time of the fuel supply periods.

4. In a governing system, the combination with an internal combustion engine embodying a plurality of working cylinders, and means for periodically supplying fuel to the engine cylinders in timed relation with the engine, of means providing a governing fluid pressure varying as a function of the speed of the engine, means responsive to the pressure of the governing fluid for controlling the quantities of fuel admitted to the engine cylinders, a conduit connecting the governing fluid pressure providing means with the pressure-responsive means, a leak-off orifice provided in the conduit, means for regulating the flow area of the orifice so as to effect desired changes in the operating speed of the engine, and means operatively connected to said regulating means and movable in response thereto for effecting changes in the time of the fuel supply periods.

5. In a governing system, the combination with an internal combustion engine embodying a crank shaft, a plurality of working cylinders, means operating in timed relation with the crank shaft for injecting fuel into the engine cylinders, and drive means connecting the crank shaft to the fuel injection means, of pumping means for developing a governing fluid pressure varying as a function of the speed of the engine, a pressure-responsive mechanism for controlling the quantities of fuel injected into the engine cylinders, conduit means for supplying governing fluid to the pump and for delivering governing fluid discharged thereby toward the pressure-responsive mechanism, a leak-off connection provided in the conduit means, a regulator for effecting changes in the flow area of the leak-off connection so as to obtain variations in the operating speed of the engine, and means operatively connecting said fuel injection drive means and said regulating means and movable in response to the latter for effecting changes in the timing relation of the fuel injection means and the engine crank shaft.

6. In a governing system, the combination with an internal combustion engine embodying a plurality of working cylinders, a crank shaft, means for supplying fuel to the engine cylinders, means for driving said fuel supplying means from the crank shaft, and adjustable means embodied in said drive means for varying the phase relation of the crank shaft relative to the fuel supplying means, of pumping means for developing a fluid pressure varying as a function of the speed of the engine, pressure-responsive means operatively connected to the fuel supply means for controlling the amount of fuel supplied to the engine cylinders, a conduit connecting the pumping means with the pressure-responsive mechanism for imposing upon the latter the fluid pressure developed by the pumping means, a leak-off connection provided in the conduit means, means for controlling the capacity of the leak-off connection, and means operatively connecting said control means to the adjustable means embodied in the fuel supply drive means for effecting changes in the phase relation of the crank shaft and the fuel supply means coincident with changes in the operating speed of the engine.

7. In a governing system, the combination with an internal combustion engine embodying a plurality of working cylinders, a crank shaft, means for supplying fuel to the cylinders, means for driving said fuel supplying means from the crank shaft, and a spline shaft embodied in said driving means and arranged to effect, upon axial movement thereof, angular displacement of the fuel supplying means relative to the crank shaft, of pumping means for developing a fluid pressure varying as a function of the speed of the engine, pressure-responsive means operatively connected to the fuel supply means for controlling quantities of fuel supplied to the engine cylinders, conduit means connecting with the pumping means and also with the pressure-responsive mechanism for imposing upon the latter the fluid pressure developed by the pumping means, an orifice communicating with the conduit means, a regulator associated with the orifice for varying the flow area thereof, and means operatively connecting the orifice regulator with the spline shaft for effecting changes in the timing of the fuel supply means coincident with changes in the operating speed of the engine.

8. In a governing system, the combination with an internal combustion engine embodying a plurality of working cylinders, a crank shaft, means for supplying fuel to the engine cylinders, means for driving said fuel supplying means from the crank shaft, and adjustable means embodied in said drive means for varying the phase relation of the crank shaft relative to the fuel supplying means, of pumping means for developing a fluid pressure varying as a function of the speed of the engine, pressure-responsive means operatively connected to the fuel supply means for controlling the amount of fuel supplied to the engine cylinders, conduit means connecting with the pumping means and with the pressure-responsive mechanism for imposing upon the latter the fluid pressure developed by the pumping means, a leak-off connection provided in the conduit means, means for controlling the capacity of the leak-off connection, a fluid motor responsive to movements of said control means, and means operatively connecting the fluid motor with the adjustable means embodied in the fuel supply drive means, whereby, coincident with changes in the operating speed of the engine, the phase relation of the fuel supplying means relative to the crank shaft is adjusted.

9. In a governing system, the combination with an internal combustion engine embodying a plurality of working cylinders, a crank shaft, means for supplying fuel to the engine cylinders, drive means for the fuel supplying means, and adjustable means embodied in said drive means and so formed as to permit relative angular adjustment of the crank shaft and the fuel supplying means, of fluid pressure means for controlling the speed of the engine, speed-changing means associated with the fluid pressure control means, and means operatively connecting said speed-changing means and said angular adjusting means and arranged to vary the angular relation of the crank shaft with respect to the fuel supplying means coincident with changes in the operating speed of the engine.

10. In a governing system, the combination with an internal combustion engine embodying a plurality of working cylinders, a crank shaft, means for supplying fuel to the engine cylinders, drive means for the fuel supplying means, and a spline shaft connecting one end of the crank shaft with said drive means and formed so that, upon axial displacement thereof, relative angular displacement of the crank shaft and the fuel supplying means is effected, of a power cylinder operatively connected to the spline shaft and disposed substantially co-axial therewith, governor means for controlling the speed of the engine, speed changer means associated with the governor means, and means operated by the speed changer means for admitting and exhausting motive fluid to and from the power cylinder coincident with adjustments of said speed changer.

11. In a governing system, the combination with an internal combustion engine embodying a plurality of working cylinders, a crank shaft, means for supplying fuel to the engine cylinders, drive means for connecting the crank shaft to said fuel supplying means, and adjustable means embodied in said drive means and so formed as to permit relative angular adjustment of the crank shaft and the fuel supplying means, of a pump for developing a fluid pressure varying as a function of the speed of the engine, means operatively connected to the fuel supplying means and responsive to the fluid pressure developed by the pump for controlling the quantities of fuel supplied to the engine cylinders, fluid leak-off means associated with the pump, speed-changer means including a regulator for varying the flow area of said leak-off means, a power cylinder including a piston operatively connected to said angular adjusting means for effecting movement thereof, and a pilot valve operatively connected to the piston of the power cylinder and to the speed-changing regulator for controlling the admission of motive fluid to and the exhaust of motive fluid from the power cylinder.

12. In a governing system, the combination with an internal combustion engine embodying a plurality of working cylinders, a crank shaft, means for supplying fuel to the engine cylinders, drive means for connecting the crank shaft to said fuel supplying means, and adjustable means embodied in said drive means and so formed as to permit relative angular adjustment of the crank shaft and the fuel supplying means, of a pump for developing a fluid pressure varying as a function of the speed of the engine, means operatively connected to the fuel supplying means and responsive to the fluid pressure developed by the pump for controlling the quantities of fuel supplied to the engine cylinders, fluid leak-off means associated with the pump, speed-changer means including a regulator for varying the capacity of said leak-off means, means operatively connecting said speed-changing regulator and said angular adjusting means for effecting movement of the latter coincident with changes in the speed of the engine, and means for adjusting the position of said speed-changing regulator relative to said angular adjusting means.

13. In a governing system, the combination with an internal combustion engine embodying a plurality of working cylinders, a crank shaft, a pump for supplying fuel to the engine cylinders, and angularly adjustable means for driving said fuel pump from the crank shaft, of a governor pump for developing a fluid pressure varying as a function of the speed of the engine, means operatively connected to the fuel pump and responsive to the fluid pressure developed by the governor pump for controlling the amount of fuel supplied to the engine cylinders, speed-changer means including a regulator for effecting variable resistances to the flow of fluid circulated by the governor pump, and means responsive to movement of said speed-changer means and operatively connected to said fuel pump drive means for effecting relative angular adjustment of the fuel pump and crank shaft coincident with changes in speed of the engine.

14. In a governing system, the combination with an internal combustion engine embodying a plurality of working cylinders, a crank shaft, means for supplying fuel to the engine cylinders, drive means for connecting the crank shaft to said fuel supplying means, and adjustable means embodied in said drive means and so formed as to permit relative angular adjustment of the crank shaft and the fuel supplying means, of a governor pump for developing a fluid pressure varying as a function of the speed of the engine, means operatively connected to the fuel supplying means and responsive to the fluid pressure developed by the governor pump for controlling the quantity of fuel supplied to the engine cylinders, fluid leak-off means associated with the pump, speed-changer means including a regulator for varying the flow area of said leak-off means, a power cylinder including a piston operatively connected to said angular adjusting means for effecting movement thereof, a pilot valve for controlling the admission of motive fluid to the power cylinder, and a floating lever operatively connected to the speed-changing regulator, the pilot valve and the piston of the power cylinder.

15. In a governing system, the combination with an internal combustion engine embodying a plurality of working cylinders, a crank shaft, means for supplying fuel to the engine cylinders, drive means for connecting the crank shaft to said fuel supplying means, and adjustable means embodied in said drive means and so formed as to permit relative angular adjustment of the crank shaft and the fuel supplying means, of a pump for developing a fluid pressure varying as a function of the speed of the engine, means operatively connected to the fuel supplying means and responsive to the fluid pressure developed by the pump for controlling the quantities of fuel supplied to the engine cylinders, fluid leak-off means associated with the pump, speed-changer means including a regulator for varying the flow area of said leak-off means, a power cylinder including a piston operatively connected to said angular adjusting means for effecting movement thereof, a pilot valve operatively connected to the piston of the power cylinder and to the speed-changing regulator for controlling the admission of motive fluid to and the exhaust of motive fluid from the power cylinder, and means for adjusting the position of the pilot valve relative to the speed-changing regulator and to the piston of the power cylinder.

16. The combination with an internal combustion engine embodying a plurality of working cylinders, means for injecting fuel into the cylinders at a positive pressure, and adjustable means associated with the injecting means for controlling the starting and stopping of the fuel injection period of each cylinder, of means for developing a governing fluid pressure varying as a function of the speed of the engine, a pressure-responsive mechanism operatively connected to the engine fuel controlling means for adjusting the same, conduit means for conveying fluid to the governing fluid pressure developing means and for conveying the governing fluid discharged therefrom to the pressure-responsive mechanism, means associated with the conduit means for effecting variable resistances to the flow of fluid therethrough, and means for maintaining said last-mentioned means in various predetermined stationary positions corresponding with different speed settings of the engine.

17. The combination with an internal combustion engine embodying a plurality of working cylinders, means for injecting fuel into the cylinders at a positive pressure, and adjustable means associated with the injecting means for controlling the starting and stopping of the fuel injection period of each cylinder, of means providing a governing fluid pressure varying as a function of the speed of the engine, a pressure-responsive mechanism operatively connected to the engine fuel controlling means for adjusting the same, conduit means for conveying fluid to the governing fluid pressure providing means and for conveying the governing fluid discharged therefrom to the pressure-responsive mechanism, a leak-off connection provided in the conduit means, and means for maintaining the flow area of said leak-off connection at various predetermined stationary amounts corresponding with different speed settings of the engine.

18. The combination with an internal combustion engine embodying a plurality of working cylinders, means for injecting fuel into the cylinders at a positive pressure, and adjustable valve means associated with the injecting means for controlling the amount of fuel injected into the engine cylinders, of means providing a governing fluid pressure varying as a function of the speed of the engine, a pressure-responsive mechanism operatively connected to the engine fuel valves for adjusting the same, conduit means for conveying fluid to the governing fluid pressure providing means and for conveying the governing fluid discharged therefrom to the pressure-responsive mechanism, a chamber provided with a leak-off orifice connection and communicating with the conduit, a regulator cooperating with the orifice for controlling the amount of fluid leakage from the conduit means, and engine speed control means connected to the orifice regulator for maintaining the same in various predetermined stationary positions corresponding with different speed settings of the engine.

19. The combination with an internal combustion engine embodying a plurality of working cylinders; means for injecting fuel into the cylinders at a positive pressure; and adjustable valve means associated with the injecting means for controlling the amount of fuel injected into the engine cylinders; of a pump driven by the engine and providing a governing fluid pressure varying as a function of the speed of the engine; a pressure-responsive governing element, said pressure-responsive governing element including a cylinder, a piston in the cylinder and a spring for controlling movements of the piston; a power cylinder including a piston operatively connected to said fuel valve means for adjusting the same; a pilot valve for controlling the admission of motive fluid to the power cylinder; said pilot valve being operatively connected to the piston of the pressure-responsive governing element a follow-up mechanism including a lever having a fixed fulcrum and operatively connected to the spring of the pressure-responsive governing element and to the piston of the power cylinder: a conduit for conveying governing fluid discharged by the pump to the cylinder of the pressure-responsive governing element, a leak-off connection provided in the conduit, and means for controlling the amount of fluid passing through the leak-off connection in order to adjust the operating speed of the engine.

20. The combination with an internal combustion engine embodying a plurality of working cylinders, a plurality of pumps having constant stroke plungers for injecting fuel into the engine cylinders at a positive pressure, valve means provided on each pump plunger for controlling the amount of fuel injected into the engine cylinders, said valve means and pump plungers being angularly adjustable so as to control the amount of fuel injected into the engine cylinders, individual means associated with the respective pump plungers for angularly adjusting the same, and master control means operatively connected to a plurality of individual adjusting means for adjusting said pump plungers simultaneously, of a pressure-responsive mechanism, a fluid motor operatively connected to the master control means and responsive to movements of the pressure-responsive mechanism, a pump driven by the engine for developing a governing fluid pressure varying as a function of the speed of the engine, conduit means for conveying the fluid pressure developed by the pump to the pressure-responsive mechanism, an orifice provided in the conduit for relieving fluid therefrom, and an adjustable valve member for regulating the flow area of the orifice and means for moving the valve member and for retaining it in fixed position for any given engine speed setting.

21. In a governing system, the combination with an internal combustion engine embodying a housing having longitudinal and transverse walls, a plurality of working cylinders supported upon the housing, a crank shaft, pistons in the cylinders and operatively connected to the crank shaft, a pump for supplying fuel to the engine cylinders, means for driving the fuel pump from the crank shaft, adjustable means embodied in said drive means for varying the angular position of the fuel pump relative to the crank shaft, and a casing for said drive means, said casing being supported upon the transverse wall of the housing, of a governor pump for developing a fluid pressure varying as a function of the speed of the engine, means responsive to the fluid pressure developed by the pump for controlling the supply of fuel to the engine cylinders, fluid leak-off means associated with the pump, speed-changer means for varying the capacity of said fluid leak-off means, a power cylinder operatively connected to the adjustable means embodied in the fuel pump drive means for actuating the same, and a pilot valve responsive to movement of the speed-changer means for controlling the admission of motive fluid to the power cylinder, said fluid leak-off means, said power cylinder and said pilot valve being supported from the casing enclosing the drive means.

22. In a governing system, the combination with an internal combustion engine embodying a housing having longitudinal and transverse walls, a plurality of working cylinders supported upon the housing, a crank shaft, pistons in the cylinders and operatively connected to the crank shaft, a pump for supplying fuel to the engine cylinders, means for driving the fuel pump from the crank shaft, adjustable means embodied in said drive means for varying the angular position of the fuel pump relative to the crank shaft, and a casing for said drive means, said casing being supported upon a transverse wall of the housing, of a governor pump for developing a fluid pressure varying as a function of the speed of the engine, means responsive to the fluid pressure developed by the pump for controlling the quantities of fuel supplied to the engine cylinders, fluid leak-off means associated with the pump, speed-changer means for varying the capacity of said fluid leak-off means, a power cylinder operatively connected to the adjustable means embodied in the fuel pump drive means for actuating the same, a pilot valve responsive to movement of the speed-changer means for controlling the admission of motive fluid to the power cylinder, and a housing supported from the drive means casing and embodying said fluid leak-off means, said power cylinder and said pilot valve.

23. In a governing system, the combination with an internal combustion engine having a plurality of working cylinders, a crank shaft, pistons in the cylinders and operatively connected to the crank shaft, a pump for supplying fuel to the engine cylinders, means for driving the fuel pump from the crank shaft, and adjustable means embodied in said drive means for varying the angular position of the fuel pump relative to the crank shaft, of a governor pump driven from the engine crank shaft for developing a fluid pressure varying as a function of the speed of the engine, a lubricating pump driven from the crank shaft of the engine, a fluid motor operatively connected to the fuel pump for adjusting the same so as to control the amount of fuel supplied to the engine cylinders, means responsive to the fluid pressure developed by the governor pump for controlling the action of said fluid motor, a second fluid motor operatively connected to the adjustable means embodied in the fuel pump drive means for actuating the same, and means for conveying lubricant discharged from the lubricating pump to the working parts of the engine and to both of said fluid motors for motivating the same.

24. In a governing system, the combination with an internal combustion engine having a plurality of working cylinders, a crank shaft, pistons in the cylinders and operatively connected to the crank shaft, a pump for supplying fuel to the engine cylinders, means for driving the fuel pump from the crank shaft, adjustable means embodied in said drive means for varying the angular position of the fuel pump relative to the crank shaft, of a governor pump driven from the crank shaft for developing a fluid pressure varying as a function of the speed of the engine, a lubricating pump driven from the engine crank shaft, a fluid motor operatively connected to the engine fuel pumps for adjusting the same so as to control the amount of fuel supplied to the engine cylinders, means responsive to the fluid pressure developed by the governor pump for controlling the action of said fluid motor, fluid leak-off means associated with the governor pump, speed-changer means for regulating the effectiveness of said leak-off means, a second fluid motor operatively connected to the adjustable means embodied in the fuel pump drive means for actuating the same, means responsive to movement of said speed-changer means for controlling the admission of motive fluid to said second fluid motor, and means for conveying lubricant from the lubricating pump to the working parts of the engine and to said first and second fluid motors for motivating the same.

In testimony whereof, I have hereunto subscribed my name this 14th day of January, 1929.

HERBERT T. HERR.